US012754900B2

(12) United States Patent
Thunuguntla et al.

(10) Patent No.: US 12,754,900 B2
(45) **Date of Patent: *Oct. 6, 2026**

(54) TRANSACTION BOUNDARIES AND REPLAY AT SCALE

(71) Applicant: Intuit Inc., Mountain View, CA (US)

(72) Inventors: Saikiran Sri Thunuguntla, Bangalore (IN); Dharshan Sastry Bhadravathi Nagaraja, Bangalore (IN); Shobha Rana, Bangalore (IN); Niranjana H C, Bangalore (IN); Basanth Jenu H B, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,979

(22) Filed: Jan. 16, 2025

(65) Prior Publication Data

US 2026/0203277 A1 Jul. 16, 2026

(51) Int. Cl.

| | |
|---|---|
| ***G06F 16/20*** | (2019.01) |
| ***G06F 16/23*** | (2019.01) |
| ***G06F 16/27*** | (2019.01) |

(52) U.S. Cl.

CPC ........ *G06F 16/2379* (2019.01); *G06F 16/278* (2019.01)

(58) Field of Classification Search

None

See application file for complete search history.

(56) References Cited

U.S. PATENT DOCUMENTS

| | | | | |
|---|---|---|---|---|
| 5,999,986 | A | 12/1999 | McCauley, III et al. | |
| 11,698,914 | B1 * | 7/2023 | Duvedi | G06F 16/28 707/803 |
| 2015/0269215 | A1 * | 9/2015 | Lehouillier | G06F 16/2358 707/626 |
| 2017/0075693 | A1 * | 3/2017 | Bishop | G06F 9/4881 |
| 2021/0117425 | A1 * | 4/2021 | Rao | H04L 41/0806 |
| 2026/0003872 | A1 * | 1/2026 | Yuan | G06F 16/24556 |

* cited by examiner

*Primary Examiner* — Jau Shya Meng

(74) *Attorney, Agent, or Firm* — Paradice & Li LLP

(57) ABSTRACT

A computing system obtains, at a source component, a set of change events, each change event associated with one of a plurality of unique identifiers and one of a plurality of transactions. The computing system partitions, using the source component, the set of change events into a plurality of partitions of a staging queue based on the unique identifiers. The computing system generates, using a distributed sink component that parallelly processes the set of change events from the staging queue, a bounded list indicating, for each respective transaction processed for each partition, a start boundary for the respective transaction, the change events associated with the respective transaction, and an end boundary for the respective transaction.

19 Claims, 9 Drawing Sheets

TRANSACTION BOUNDARIES AND REPLAY AT SCALE

CROSS-REFERENCE TO RELATED APPLICATION

This application is related to U.S. patent application Ser. No. 19/026,017 entitled "RESOLVING OPEN TRANSACTIONS" and filed on Jan. 16, 2025, which is assigned to the assignee hereof. The disclosures of all prior Applications are considered part of and are incorporated by reference in this Patent Application.

TECHNICAL FIELD

This disclosure relates generally to bounding transactions, and specifically to bounding transactions at scale.

DESCRIPTION OF RELATED ART

Modern databases can store vast amounts of data, often reaching gigabytes or terabytes in size. As organizations scale, this data is frequently distributed across multiple database clusters, sometimes spanning dozens of systems. Processing such large datasets requires significant computational resources and time, and managing this data introduces challenges such as data errors, latency issues, and operational failures. These challenges are exacerbated when organizations must meet strict Service Level Agreements (SLAs) concerning data availability and reporting accuracy. Many event-driven systems generate billions of daily changes across distributed tables in multiple source databases. Each transaction can span multiple tables and involve hundreds of thousands of data points, with increasing complexity as the number of users or entities grows into the millions.

Several examples illustrate the scope of these challenges, where sets of related events can be grouped and processed as transactions. As one example, with respect to Massively Multiplayer Online Role-Playing Games (MMORPGs), millions of players generate event transactions, such as movements, actions, and trades. These transactions consist of related events that affect various tables, including player profiles, inventories, and world states. Grouping these events into transactions enables analysis of player behavior and game performance. As another example, global sensor networks, such as those monitoring environmental data, generate continuous readings of temperature, pressure, and other metrics. These readings can be grouped into transactions based on time intervals or geographic regions, allowing for trend detection and anomaly analysis. As another example, with respect to social media platforms, billions of daily user interactions—such as posts, comments, and shares—can be grouped into transactions associated with individual users or posts. Grouping these related events allows platforms to analyze user engagement, content interactions, and trending topics. As yet another example, businesses process and analyze transactional data to report cash flow, sales, account statements, and invoices, where grouping data related to specific transactions enables accurate computation of aggregates and insights, such as identifying trends in sales or payments. As yet another example, GPS-based wildlife tracking involves tagging animals to obtain continuous location updates and environmental data. These updates can be grouped into transactions based on individual animals and time periods, allowing researchers to track migration patterns and study behavioral responses to environmental conditions.

Processing these event transactions at scale while adhering to required latency constraints is a significant technical challenge. Large-scale data pipelines must process vast amounts of data efficiently while minimizing errors. Issues such as system failures, data loss, and bugs are common in these environments. When managing stateful, event-driven distributed systems, these challenges are increased further. Data may be distributed across many database clusters, and failures in one component can disrupt the entire system. Additionally, events stored in source databases are often temporary. Once they are read, they are typically deleted, making it difficult to recover raw event data if downstream errors occur. While Java Database Connectivity (JDBC) queries can be effective in smaller setups, they are inefficient at scale due to their heavy resource consumption. JDBC queries pull entire databases, which is impractical in large-scale, real-time systems that require timely responses for users.

Accordingly, there is a need for scalable, efficient methods to handle large volumes of distributed, event-based transactions while ensuring system reliability and performance.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for bounding transactions. An example method is performed by one or more processors of a computing system and can include obtaining, at a source component of the computing system, a set of change events, each change event associated with one of a plurality of unique identifiers and one of a plurality of transactions, partitioning, using the source component, the set of change events into a plurality of partitions of a staging queue of the computing system based on the unique identifiers, and generating, using a distributed sink component of the computing system that parallelly processes the set of change events from the staging queue, a bounded list indicating, for each respective transaction processed for each partition, a start boundary for the respective transaction, the change events associated with the respective transaction, and an end boundary for the respective transaction.

In some implementations, the obtaining includes extracting the set of change events from a source database, where the source database is one of a plurality of source databases managed by a database management system (DBMS) serving a plurality of source applications. In some aspects, the set of change events is extracted from a change log generated by the DBMS based on changes made to tables used by the plurality of source applications. In some instances, each transaction of the plurality of transactions is associated with a subset of the change events associated with changes made to the tables distributed across the plurality of source applications.

In some other implementations, partitioning the set of change events includes partitioning change events associated with a same unique identifier into a same partition. In some aspects, each of the plurality of unique identifiers is a hash value generated using a hash function on a selected identifier for an entity associated with the corresponding change event. In some instances, each of the plurality of partitions is associated with a unique partition identifier, and partitioning a given change event includes performing a modulo operation on the hash value and a total number of the partitions, matching a result of the modulo operation with one of the unique partition identifiers, and partitioning the given change event into the partition corresponding to the matching one of the unique partition identifiers.

In some implementations, the distributed sink component includes a plurality of sink component instances, wherein each respective sink component instance maintains a local map indicating a subset of the partitions to which the respective sink component instance is mapped. In some aspects, each local map is a key-value pair data structure. In some instances, the staging queue defines an even distribution of the plurality of partitions across the plurality of sink component instances such that a difference between each number of partitions mapped to each sink component instance is minimized. In some implementations, the method further includes determining that one of the sink component instances has become unavailable, and redistributing the partitions mapped to the unavailable sink component instance to the remaining sink component instances. In some instances, the method further includes detecting that the unavailable sink component instance has resumed processing change events, rebalancing the even distribution to account for the unavailable sink component instance resuming processing, determining, for each respective one of the remaining sink component instances, a difference between the partitions mapped to the respective sink component instance before the partitions mapped to the unavailable sink component instance were redistributed and the partitions mapped to the respective sink component instance after the partitions mapped to the unavailable sink component instance were redistributed, determining, based on the determined differences, change events duplicatively processed by each respective remaining sink component instance, and clearing, from a processing cache of each respective remaining sink component instance, the duplicatively processed change events.

In some other implementations, the method further includes determining, for each respective partition mapped to a given sink component instance, a most recently processed transaction for the respective partition. In some aspects, determining the most recently processed transaction for each respective partition includes determining, for each current change event being processed by the given sink component instance for the respective partition, whether the current change event is associated with a different transaction than a prior change event most recently processed by the given sink component instance for the respective partition, and upon determining that the transaction associated with the current change event is different than the transaction associated with the prior change event, determining that the transaction associated with the prior change event is the most recently processed transaction for the respective partition. In some implementations, the method further includes, upon determining that the transaction associated with the current change event is different than the transaction associated with the prior change event, inserting, in a field associated with the respective partition in the bounded list, an end boundary for the transaction associated with the prior change event and a start boundary for the transaction associated with the current change event.

In some implementations, the method further includes partitioning, using the distributed sink component, the bounded list into corresponding partitions of a target queue of the computing system. In some instances, the method further includes storing the set of change events in a replay store communicably coupled to the staging queue. In some instances, the method further includes detecting, in at least one partition of the target queue, one or more errors in the bounded list, triggering a replay event for a timeframe relevant to the detected one or more errors, retrieving, from the replay store, the change events corresponding to the at least one partition for the relevant timeframe based on the triggering, partitioning the retrieved change events into corresponding partitions of the staging queue, repairing, using the distributed sink component, one or more portions of the bounded list based on the retrieved change events, and partitioning the repaired bounded list into the corresponding partitions of the target queue. In some other instances, the method further includes providing, by the target queue, bounded transactions to a data repository based on the bounded list, where the data repository is a data warehouse including a data mart coupled to one or more reporting applications.

Another innovative aspect of the subject matter described in this disclosure can be implemented in a computing system for bounding transactions. An example system includes one or more processors and at least one memory coupled to the one or more processors and storing instructions that, when executed by the one or more processors, cause the system to perform operations. The operations can include obtaining, at a source component, a set of change events, each change event associated with one of a plurality of unique identifiers and one of a plurality of transactions, partitioning, using the source component, the set of change events into a plurality of partitions of a staging queue of the computing system based on the unique identifiers, and generating, using a distributed sink component that parallelly processes the set of change events from the staging queue, a bounded list indicating, for each respective transaction processed for each partition, a start boundary for the respective transaction, the change events associated with the respective transaction, and an end boundary for the respective transaction.

In some implementations, the obtaining includes extracting the set of change events from a source database, where the source database is one of a plurality of source databases managed by a database management system (DBMS) serving a plurality of source applications. In some aspects, the set of change events is extracted from a change log generated by the DBMS based on changes made to tables used by the plurality of source applications. In some instances, each transaction of the plurality of transactions is associated with a subset of the change events associated with changes made to the tables distributed across the plurality of source applications.

In some other implementations, partitioning the set of change events includes partitioning change events associated with a same unique identifier into a same partition. In some aspects, each of the plurality of unique identifiers is a hash value generated using a hash function on a selected identifier for an entity associated with the corresponding change event. In some instances, each of the plurality of partitions is associated with a unique partition identifier, and partitioning a given change event includes performing a modulo operation on the hash value and a total number of the partitions, matching a result of the modulo operation with one of the unique partition identifiers, and partitioning the given change event into the partition corresponding to the matching one of the unique partition identifiers.

In some implementations, the distributed sink component includes a plurality of sink component instances, wherein each respective sink component instance maintains a local map indicating a subset of the partitions to which the respective sink component instance is mapped. In some aspects, each local map is a key-value pair data structure. In some instances, the staging queue defines an even distribution of the plurality of partitions across the plurality of sink component instances such that a difference between each number of partitions mapped to each sink component instance is minimized. In some implementations, the operations further include determining that one of the sink component instances has become unavailable, and redistributing the partitions mapped to the unavailable sink component instance to the remaining sink component instances. In some instances, the operations further include detecting that the unavailable sink component instance has resumed processing change events, rebalancing the even distribution to account for the unavailable sink component instance resuming processing, determining, for each respective one of the remaining sink component instances, a difference between the partitions mapped to the respective sink component instance before the partitions mapped to the unavailable sink component instance were redistributed and the partitions mapped to the respective sink component instance after the partitions mapped to the unavailable sink component instance were redistributed, determining, based on the determined differences, change events duplicatively processed by each respective remaining sink component instance, and clearing, from a processing cache of each respective remaining sink component instance, the duplicatively processed change events.

In some other implementations, the operations further include determining, for each respective partition mapped to a given sink component instance, a most recently processed transaction for the respective partition. In some aspects, determining the most recently processed transaction for each respective partition includes determining, for each current change event being processed by the given sink component instance for the respective partition, whether the current change event is associated with a different transaction than a prior change event most recently processed by the given sink component instance for the respective partition, and upon determining that the transaction associated with the current change event is different than the transaction associated with the prior change event, determining that the transaction associated with the prior change event is the most recently processed transaction for the respective partition. In some implementations, the operations further include, upon determining that the transaction associated with the current change event is different than the transaction associated with the prior change event, inserting, in a field associated with the respective partition in the bounded list, an end boundary for the transaction associated with the prior change event and a start boundary for the transaction associated with the current change event.

In some implementations, the operations further include partitioning, using the distributed sink component, the bounded list into corresponding partitions of a target queue. In some instances, the operations further include storing the set of change events in a replay store communicably coupled to the staging queue. In some instances, the operations further include detecting, in at least one partition of the target queue, one or more errors in the bounded list, triggering a replay event for a timeframe relevant to the detected one or more errors, retrieving, from the replay store, the change events corresponding to the at least one partition for the relevant timeframe based on the triggering, partitioning the retrieved change events into corresponding partitions of the staging queue, repairing, using the distributed sink component, one or more portions of the bounded list based on the retrieved change events, and partitioning the repaired bounded list into the corresponding partitions of the target queue. In some other instances, the operations further include providing, by the target queue, bounded transactions to a data repository based on the bounded list, where the data repository is a data warehouse including a data mart coupled to one or more reporting applications.

Another innovative aspect of the subject matter described in this disclosure can be implemented as a non-transitory computer-readable medium storing instructions that, when executed by one or more processors of a system for bounding transactions, cause the system to perform operations. Example operations include obtaining, at a source component, a set of change events, each change event associated with one of a plurality of unique identifiers and one of a plurality of transactions, partitioning, using the source component, the set of change events into a plurality of partitions of a staging queue of the computing system based on the unique identifiers, and generating, using a distributed sink component that parallelly processes the set of change events from the staging queue, a bounded list indicating, for each respective transaction processed for each partition, a start boundary for the respective transaction, the change events associated with the respective transaction, and an end boundary for the respective transaction.

In some implementations, the obtaining includes extracting the set of change events from a source database, where the source database is one of a plurality of source databases managed by a database management system (DBMS) serving a plurality of source applications. In some aspects, the set of change events is extracted from a change log generated by the DBMS based on changes made to tables used by the plurality of source applications. In some instances, each transaction of the plurality of transactions is associated with a subset of the change events associated with changes made to the tables distributed across the plurality of source applications.

In some other implementations, partitioning the set of change events includes partitioning change events associated with a same unique identifier into a same partition. In some aspects, each of the plurality of unique identifiers is a hash value generated using a hash function on a selected identifier for an entity associated with the corresponding change event. In some instances, each of the plurality of partitions is associated with a unique partition identifier, and partitioning a given change event includes performing a modulo operation on the hash value and a total number of the partitions, matching a result of the modulo operation with one of the unique partition identifiers, and partitioning the given change event into the partition corresponding to the matching one of the unique partition identifiers.

In some implementations, the distributed sink component includes a plurality of sink component instances, wherein each respective sink component instance maintains a local map indicating a subset of the partitions to which the respective sink component instance is mapped. In some aspects, each local map is a key-value pair data structure. In some instances, the staging queue defines an even distribution of the plurality of partitions across the plurality of sink component instances such that a difference between each number of partitions mapped to each sink component instance is minimized. In some implementations, the operations further include determining that one of the sink component instances has become unavailable, and redistributing the partitions mapped to the unavailable sink component instance to the remaining sink component instances. In some instances, the operations further include detecting that the unavailable sink component instance has resumed processing change events, rebalancing the even distribution to account for the unavailable sink component instance resuming processing, determining, for each respective one of the remaining sink component instances, a difference between the partitions mapped to the respective sink component instance before the partitions mapped to the unavailable sink component instance were redistributed and the partitions mapped to the respective sink component instance after the partitions mapped to the unavailable sink component instance were redistributed, determining, based on the determined differences, change events duplicatively processed by each respective remaining sink component instance, and clearing, from a processing cache of each respective remaining sink component instance, the duplicatively processed change events.

In some other implementations, the operations further include determining, for each respective partition mapped to a given sink component instance, a most recently processed transaction for the respective partition. In some aspects, determining the most recently processed transaction for each respective partition includes determining, for each current change event being processed by the given sink component instance for the respective partition, whether the current change event is associated with a different transaction than a prior change event most recently processed by the given sink component instance for the respective partition, and upon determining that the transaction associated with the current change event is different than the transaction associated with the prior change event, determining that the transaction associated with the prior change event is the most recently processed transaction for the respective partition. In some implementations, the operations further include, upon determining that the transaction associated with the current change event is different than the transaction associated with the prior change event, inserting, in a field associated with the respective partition in the bounded list, an end boundary for the transaction associated with the prior change event and a start boundary for the transaction associated with the current change event.

In some implementations, the operations further include partitioning, using the distributed sink component, the bounded list into corresponding partitions of a target queue. In some instances, the operations further include storing the set of change events in a replay store communicably coupled to the staging queue. In some instances, the operations further include detecting, in at least one partition of the target queue, one or more errors in the bounded list, triggering a replay event for a timeframe relevant to the detected one or more errors, retrieving, from the replay store, the change events corresponding to the at least one partition for the relevant timeframe based on the triggering, partitioning the retrieved change events into corresponding partitions of the staging queue, repairing, using the distributed sink component, one or more portions of the bounded list based on the retrieved change events, and partitioning the repaired bounded list into the corresponding partitions of the target queue. In some other instances, the operations further include providing, by the target queue, bounded transactions to a data repository based on the bounded list, where the data repository is a data warehouse including a data mart coupled to one or more reporting applications.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
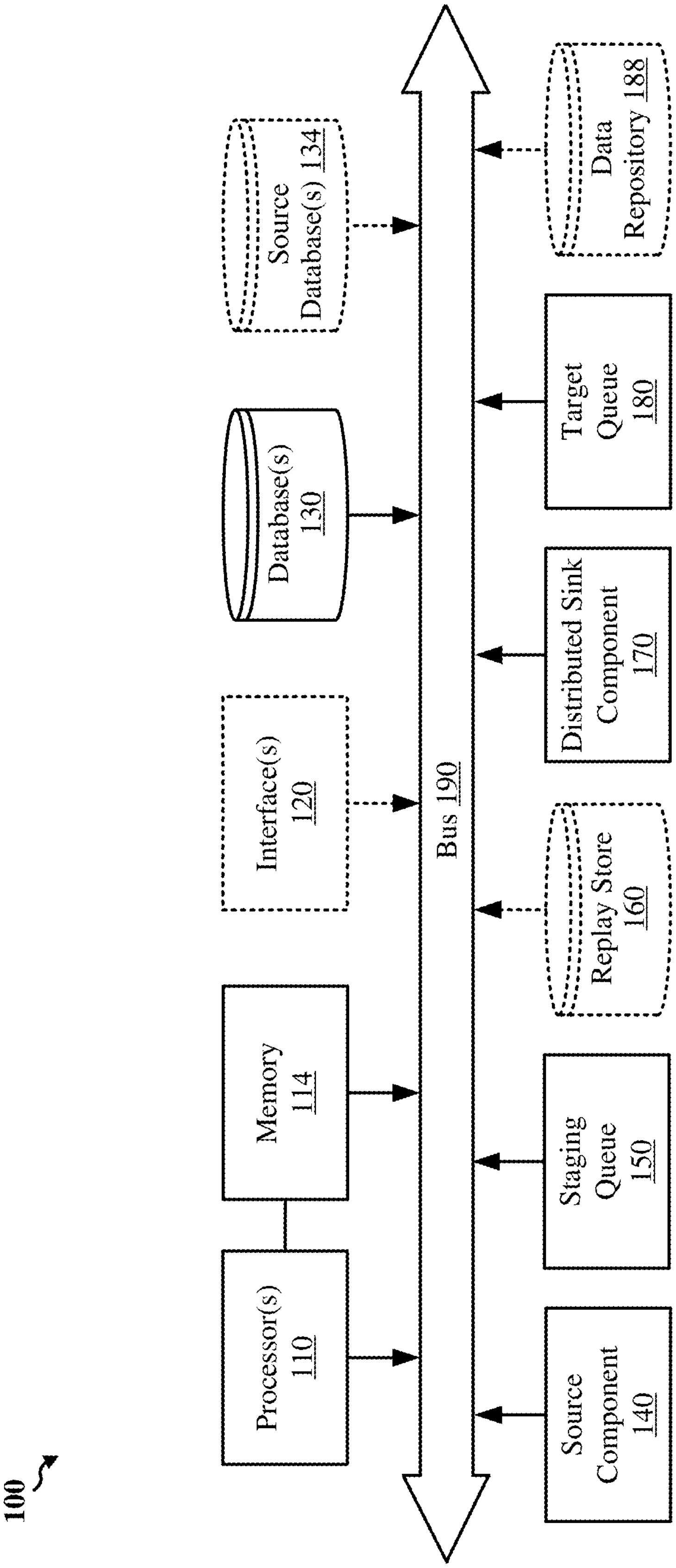
FIG. 1 shows an example computing system, according to some implementations.

As described above, managing large, distributed datasets in modern databases presents significant computational and operational challenges, especially when stringent Service Level Agreements (SLAs) must be met, and processing large-scale event transactions efficiently and reliably is technically challenging due to potential system failures, data loss, and the limitations of traditional data access methods like Java Database Connectivity (JDBC). A need exists for scalable and efficient solutions to process large, distributed events and to group event-based transactions for analysis and insights while maintaining system reliability and performance.

Aspects of the present disclosure provide innovative systems and methods for bounding transactions at scale. A computing system may be used to perform the various operations of the systems and methods disclosed herein. In some implementations, the computing system may be implemented in a data pipeline as a transaction adapter including one or more subcomponents communicably coupled to other components in the data pipeline. The subcomponents may include, as one example, a source component, a staging queue, and a distributed sink component. The source component may obtain change events that are each associated with a unique identifier and a particular transaction, and partition the change events into partitions of the staging queue based on the unique identifiers. Thereafter, the distributed sink component may parallelly process the change events and generate a bounded list indicating, for each transaction associated with each unique identifier, a start boundary, an end boundary, and the ones of the change events associated with the transaction.

In various implementations, the change events are based on changes tracked in a source database. The source database may be one of many databases managed by a relational database management system (RDBMS). Specifically, the RDBMS may create a change log that records the changes, and each change may be linked to a specific transaction. Accordingly, each transaction may correspond to a subset of the changes made to various tables that can span across many source applications.

In various implementations, change events that share the same unique identifier are grouped into the same partition in the staging queue. In some instances, the unique identifier is generated by applying a hash function to an identifier associated with an entity (e.g., a username, a customer ID, or the like) related to the change event. The computing system may perform a modulo operation on the hash value to assign the change event to one of the available partitions.

In various implementations, the sink component is distributed into multiple instances that each processing a subset of the change events. Change events associated with a same unique identifier are processed by a same sink component instance. Specifically, each instance is assigned a subset of partitions that are distributed as evenly as possible. If a sink component instance becomes unavailable, the computing system may redistribute the partitions to the remaining sink component instances. Once the unavailable component is back online, the computing system may rebalance the partitions and remove any duplicated change events that were processed by multiple components during the redistribution.

In various implementations, the most recent transaction processed for each partition is tracked in a key-value pair data structure. When a new change event is processed, the computing system determines whether it is associated with a different transaction than the last event. If it is, the computing system records boundaries between the old and new transactions, such as in a corresponding partition of a target queue. The target queue can provide bounded transactions to, for example, a data warehouse for further use by reporting applications.

In various implementations, the change events are stored in a replay store to enable an error recovery mechanism. Specifically, if errors are detected downstream, the computing system retrieves the relevant change events from the replay store, reprocesses them, and repairs any issues in the corresponding partition. Once the issues are resolved, the data is partitioned again and resent to the target queue.

In these and other manners, the computing system described herein provides several technical benefits over conventional solutions for processing event-based transactions at scale. By bounding event-based transactions at massive scale, the system ensures precise transaction boundaries for accurate reporting, enables real-time reporting dashboards, and helps meet strict SLAs by enabling efficient processing of billions of events daily with latency control. By ensuring that all events for each transaction associated with a given entity (e.g., a user, a customer) are bound by unique start and end events, the system facilitates building accurate reports within transaction boundaries, ensuring data consistency and reducing the chance of error during processing reports for each entity. By using a source component (e.g., a database bin log adapter) to consume massive amounts of source data across multiple clusters and shards, the system efficiently ingests data from dozens of source database clusters, enabling scalability to handle billions of events daily while maintaining system reliability and performance. By distributing event-based transaction processing across a distributed sink component, the system enhances fault tolerance, optimizes resource utilization, and ensures global availability, thereby serving millions of customers and improving user satisfaction. By writing to multiple partitions in a staging queue, the system maximizes parallel processing efficiency, supports large-scale data ingestion, and minimizes latency, thereby helping meet strict SLAs and enabling real-time reporting dashboards. By performing hardware pod rebalancing and reassignment when partitions of a distributed sink component are moved, the system optimizes load distribution, enhances resource efficiency, and ensures system reliability, particularly in less busy clusters, contributing to overall performance improvement. By maintaining state information for transactions processed in each partition, the system ensures transactional integrity, minimizes data loss risks, and supports real-time error recovery, thereby contributing to reliability and latency reduction in transaction processing. By enabling a replay mechanism for error correction, the system offers a robust mechanism for recovering, for example, raw change data capture (CDC) events in case of data loss, thereby ensuring data integrity, enhancing system reliability, and maintaining strict SLAs. By reading from multiple partitions that correspond to the written partitions, the system ensures synchronization across distributed processing units, facilitates real-time reporting, and reduces latency, thereby contributing to user satisfaction and supporting real-time dashboards. By closing previous transactions once new ones start, the system ensures transactional consistency, avoids overlapping transactions, and optimizes reporting within transaction boundaries, ensuring accurate data availability for real-time dashboards.

Aspects of the subject matter disclosed herein are not an abstract idea such as a mental process that can be performed in the human mind. For example, the human mind is not capable of bounding transactions at scale. Further, the human mind is not capable of extracting or receiving change events from a source database over a communications network, such as thousands, millions, billions, or more change events. Nor is the human mind capable of partitioning massive amounts of change events into a staging queue, generating a bounded list indicating boundaries for transactions associated with the change events, nor performing many of the other actions performable by the computing system described herein. In addition, aspects of the subject matter disclosed herein are not an abstract idea such as a method of organizing human activity because the claims of this patent application do not recite any fundamental economic practice, commercial interaction, legal interaction, or business relations. Moreover, various implementations of the subject matter disclosed herein provide technical solutions to the technical problem of improving the capability and functionality (e.g., speed, accuracy, etc.) of computer-based systems, where the technical solutions can be practically and practicably applied to improve on existing techniques for bounding transactions. Implementations of the subject matter disclosed herein provide specific inventive steps describing how desired results are achieved and realize meaningful and significant improvements on existing computer functionality—that is, the performance of computer-based systems operating in the evolving technological field of bounding transactions at scale.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an example computing system 100, according to some implementations. Various aspects of the computing system 100 disclosed herein are generally applicable for bounding transactions at scale. The computing system 100 includes a combination of one or more processors 110, a memory 114 coupled to the one or more processors 110, one or more interfaces 120, one or more databases 130, one or more source databases 134, a source component 140, a staging queue 150, a replay store 160, a distributed sink component 170, a target queue 180, and/or a data repository 188. In some implementations, the various components of the computing system 100 are interconnected by at least a data bus 190. In some other implementations, the various components of the computing system 100 are interconnected using other suitable signal routing resources.

The processor 110 includes one or more suitable processors capable of executing scripts or instructions of one or more software programs stored in the computing system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more hardware accelerators for processing a large amount of data and/or one or more AI accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 110 may use hardware-based TPUs to process and/or adjust millions, billions, or trillions of artificial neural network (ANN) parameters within seconds, milliseconds, or microseconds.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

In some implementations, one or more input/output (I/O) interfaces (e.g., the interface 120) may be used for transmitting or receiving (e.g., over a communications network) transmissions, input data, and/or instructions to or from a computing device (e.g., associated with a user), outputting data (e.g., over the communications network) to the computing device, or the like. The interface 120 may also be used to provide or receive other suitable information, such as computer code for updating one or more programs stored on the computing system 100, internet protocol requests and results, or the like. An example interface includes a wired interface or wireless interface to the Internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the computing system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the computing system 100 by a local user or moderator.

The database 130 may store data associated with the computing system 100, such as changes, events, change data capture (CDC) information, event bus (EB) information, transaction information, transaction boundaries, bounded lists, identifiers, partition information, queue information, change logs, source application information, table information, hash values, hash functions, entity information, user information, customer information, modulo operations, partition distribution information, processing caches, error information, among other suitable information. In some implementations, the database 130 incorporates one or more aspects of a database management system (DBMS) or a relational DBMS (RDBMS). In various implementations, the database 130 may store data associated with transmissions, requests, responses, applications, instructions, user data, action information, configurations, thresholds, filters, data assets, preferences, priorities, timestamps, models, algorithms, modules, engines, user information, historical data, recent data, current or real-time data, files, plugins, metadata, arrays, tags, queries, feedback, insights, formats, features, among other suitable information. In various implementations, the database 130 may store data in one or more cloud object storage services, such as one or more Amazon Web Services (AWS)-based Simple Storage Service (S3) buckets. In various implementations, the data may be stored in one or more JavaScript Object Notation (JSON) files, comma-separated values (CSV) files, or any other suitable data objects for processing by the computing system 100. In some implementations, the data may be stored in one or more Structured Query Language (SQL) compliant data sets for filtering, querying, and sorting, or any other suitable format for processing by the computing system 100. In various implementations, the database 130 includes a relational database capable of presenting information as data sets in tabular form and capable of manipulating the data sets using relational operators. In various implementations, the database 130 is a part of or separate from the source database 134, the replay store 160, the data repository 188, and/or another suitable physical or cloud-based data store.

In some implementations, a source database (e.g., the source database 134) stores data associated with change events, such as the change events themselves, CDC information, EB information, transaction information, identifiers, logs, tables, hash values, among other information related to change events. In some implementations, the source database 134 is one of a plurality of source databases managed by the database 130. The source database 134 may incorporate aspects of MySQL, Postgres, Cassandra, DynamoDB, or another suitable database for serving end-users for operations involving change events such as inserts, reads, updates, and deletes.

The change events stored in the source database 134 may be extracted from a change log (e.g., generated by the database 130) based on changes made to tables used by various source applications. Specifically, the change events may represent modifications within the source database 134 that are extracted from the change log. Specifically, the change log may include inserts, reads, updates, and deletes based on one or more aspects of CDC, such as timestamp-based tracking, log-based capture, trigger-based mechanisms, or the like. Each change event may be associated with one of a plurality of unique identifiers. For example, each unique identifier may be a hash value generated using a hash function on an identifier used to identify an entity (e.g., an entity ID), a user (e.g., a username), or a customer (e.g., a customer ID) associated with the corresponding change event. Furthermore, each change event may be one of a subset of the change events related to a particular transaction associated with the entity, user, or customer. For instance, the subset of change events may be associated with various changes made (e.g., by an entity that executed the event or other entities associated with the executing entity) to various tables distributed across various applications.

As a non-limiting example, a subset of the change events related to a single return-based transaction in an e-commerce system may include: an inventory table managed by an inventory application being updated to increase the available stock for the returned item, a customer feedback table being updated to reflect a return and capture any related customer feedback, a return shipment being logged by a shipping application in a return logistics table including return status and carrier details, a return inspection table being modified by a warehouse management application to document any outcome of the product inspection and whether the item can be resold, a loyalty points table being updated by a customer account application to deduct any points earned from the returned purchase, and an email notification application logging the transmission of a return confirmation email to the customer in a notification table.

The source component 140 may be used to obtain change events from the source database 134, such as by obtaining the change events from a transmission received over a communications network. The source component 140 may be a database adapter that reads change events or associated updates from bin logs or write-ahead files in the source database 134. As one example, the source component 140 may be a Debezium engine that reads CDC events from a PostgreSQL bin log stored in the source database 134. For purposes of discussion herein, the source component 140 may also be referred to as an event emitter, an event producer, or another suitable term for a component that generates events or messages based on actions, changes, or processes extracted from the source database 134 and that sends or publishes the events or messages to an intermediary queue, topic, channel, or system (e.g., the staging queue 150) for further processing. The source component 140 may be used to partition the change events into the staging queue 150.

The staging queue 150 includes a plurality of partitions (e.g., 50) into which the change events are split or partitioned. The staging queue 150 may operate as an intermediary layer that temporarily holds the change events from the source component 140 until they are consumed downstream, such as by the distributed sink component 170 and/or the replay store 160. In some implementations, the staging queue 150 is a Kafka staging topic divided into partitions for parallel processing. In some aspects, the staging queue 150 may be used to maintain state information of events being processed for a given partition. In various implementations, alternatives to Kafka may include RabbitMQ, AWS Simple Queue Service (SQS), Azure Event Grid, or any other messaging system. For purposes of discussion herein, the staging queue 150 may also be referred to as a message queue, a message broker, event stream, or another suitable term for a component that stores and delivers messages or a continuous flow of events.

In some implementations, the incoming change events are partitioned into the staging queue 150 based on a partitioning strategy that deterministically distributes the change events across multiple partitions. For example, the change events may be partitioned based on a hash of the unique identifier associated with each change event. In this manner, all change events pertaining to a same unique identifier are consistently stored in a same partition. In some implementations, the source component 140 performs the partitioning using a modulo operation. As a non-limiting example, the hash of the unique identifier (e.g., company ID) may be taken modulo a total number of the partitions: partitionId=hash (companyId) mod NumPartitions. In this manner, a result of the modulo operation corresponds to one of the sequential partition identifiers, thereby determining the partition into which the given change event is directed.

A simplified example output from the source component 140 assigning the change events (e) to various of the partitions (P) of the staging queue 150 based on the unique identifiers (c) may be "P0→c1e1, c1e2, . . . , c1e40, c2e1, c2e2, . . . , c2e560322; P1→c3e1, c3e2, . . . , c3e123040, c4e1, c4e2, . . . , c4e100; . . . P49→c100e1, c100e2, . . . , c100e47238, c101e1, c101e2, . . . , c101e53409," where c1e40 represents the $40^{th}$ and final event for a first transaction associated with a first user (whose change events will all be stored in partition 0), c2e560322 represents the $560322^{nd}$ event for a second transaction associated with a second user (whose change events will all be stored in partition 0), c3e123040 represents the $123040^{th}$ and final event for a third transaction associated with a third user (whose change events will all be stored in partition 1), and so on. To note, the number of change events and users associated with each partition may be millions or billions in actual practice.

In some implementations, a replay store (e.g., the replay store 160) stores data associated with the change events. For example, the replay store 160 may be used to store a backup copy of the change events partitioned into the staging queue 150. In some instances, the replay store 160 includes data stored in one or more cloud object storage services, such as one or more AWS-based S3 buckets. In some implementations, such as when the staging queue 150 is a Kafka topic, the staging queue 150 automatically writes the change events to the replay store 160 when the change events are partitioned into the staging queue 150. For instance, an S3 writer subcomponent of the staging queue 150 may read data from each partition of the staging queue 150 and generate a backup of the data in a corresponding S3 bucket of the replay store 160. As further described below, in the event of a transactional violation or issue downstream, the transaction associated with the violation or issue and its corresponding time window may be determined. Once the affected time window is determined, a replay process may be triggered in the replay store 160. The replay process may involve retrieving the relevant data (e.g., based on the affected time window) from the corresponding S3 bucket and replaying the relevant data to the corresponding staging topic in the staging queue 150. In this manner, downstream issues (e.g., identified in the distributed sink component 170) may be effectively resolved, thereby ensuring system consistency and correct state management, even though the original change events may have already been removed from the source database 134 and/or the staging queue 150. In various implementations, the replay store 160 may incorporate one or more aspects of various alternatives to S3, such as various other cloud storage providers (e.g., Google Cloud Storage, Azure Blob Storage, DigitalOcean Spaces, Backblaze B2), file systems (e.g., Network File System (NFS), Server Message Block (SMB), Common Internet File System (CIFS), Hadoop Distributed File System (HDFS)), databases (e.g., DynamoDB, Cassandra, MongoDB, PostgreSQL, MySQL), message queues (e.g., SQS, RabbitMQ, Kafka), and/or event streaming platforms (e.g., Apache Event Hubs), depending on various factors such as amount of data, structure of data, data access requirements, and data complexity.

The distributed sink component 170 consumes change events from an intermediary layer (e.g., the staging queue 150), processes and/or transforms the change events by applying modifications and/or logic, and prepares the change events for delivery to the target queue 180. To facilitate parallel processing of data from the staging queue 150, the distributed sink component 170 includes multiple sink component instances across a distributed system. In some implementations, each sink component instance may be referred to as a pod, such as in a Kubernetes-based implementation. In various other implementations, each sink component instance may be referred to as a worker, a process, an instance, a container, a node, an actor, a thread, or another suitable term referring to an individual of a whole cooperatively consuming and processing data from the staging queue 150. For purposes of discussion herein, the distributed sink component 170 may also be referred to as a sink, a sink component, an event consumer, an event processor, a consumer group, or another suitable term to describe a group of components that work together to ingest data from the various partitions of the staging queue 150 into the target queue 180. As a non-limiting example, a distributed system implementation may include over 50 deployments of the system 100 that each include a distributed sink component 170, where each distributed sink component 170 has over 30 sink component instances. In each respective deployment or "cluster" (e.g., each having its own source database 134), each sink component instance may consume data from a staging queue 150 dedicated to a specific shard of the respective deployment. Each sink component instance may be responsible for processing data from a designated subset of partitions within the corresponding staging queue 150. Because each sink component instance in the distributed sink component 170 is assigned to process change events for specific partitions, the system 100 ensures that each sink component instance processes the same partitions throughout its operation. In this manner, the distributed system can ingest vast amounts of data from the various staging queues into their corresponding target queues.

An even distribution of the partitions may be defined (e.g., by the staging queue 150) across the sink component instances of the distributed sink component 170. For example, the even distribution may ensure that a difference between each number of partitions mapped to each sink component instance is minimized. As a simplified example, when there are 1225 partitions and 50 sink component instances for a given cluster, the staging queue 150 may distribute 25 partitions to 25 of the sink component instances and 24 partitions to the remaining 25 sink component instances, thereby minimizing the difference in the number of partitions handled by any two sink component instances in the given cluster by at most 1 and ensuring the most even distribution possible.

The distributed sink component 170 may employ various mechanisms to dynamically reassign partitions when sink component instance availabilities change, thereby ensuring that data processing continues even in the event of sink component instance failures, reboots, or the like. Example mechanisms for determining sink component instance availabilities may include a heartbeat mechanism, pulse-based monitoring, gossip protocols, failure detectors, regular interval checks, timeout thresholds, or another suitable technique for determining sink component instance availability. In some implementations, each respective sink component instance maintains a local map indicating a subset of the partitions to which the respective sink component instance is mapped, where each local map is a key-value pair data structure. As a non-limiting example, the local map for sink component instance 3 may include an entry for partitions 72, 73, 74, . . . , 96, indicating that sink component instance 3 is responsible for processing data associated with partitions 72-96. In the event that one of the sink component instances is determined to have become unavailable, the partitions mapped to the unavailable sink component instance will be redistributed to the remaining sink component instances. As a non-limiting example, if sink component instance 17 (e.g., responsible for partitions 408-432) becomes unavailable, partitions 408-432 may be redistributed one-by-one to the remaining 49 sink component instances, starting with sink component instance 1 and cycling through the remaining available sink component instances, and each local map may be updated to reflect the new partition assignments. In various implementations, the redistribution may be performed by the staging queue 150 and/or a coordinator subcomponent of the distribution sink component 170.

Continuing the non-limiting example above, upon determining that sink component instance 17 has resumed operation (e.g., recovered, rebooted, or the like), the partition distributions may be rebalanced. Specifically, partitions 408-432 may be returned to sink component instance 17, and each of the local maps may be updated to reflect this change. To address potential data duplication during the failure period, each sink component instance may determine a difference between its partition assignments before and after the redistribution. The determined difference identifies the partition from which duplicate change events may have been processed. For this example, because sink component instance 1's difference is only partition 408, any change events from partition 408 that arrived while sink component instance 17 was down and were processed by sink component instance 1 are duplicates. Thus, each sink component instance may consider its own processing cache and remove any entries originating from the temporarily assigned partition, thereby clearing any duplicatively processed change events and ensuring data consistency and fault tolerance within the distributed system.

The distributed sink component 170 may be used to generate a bounded list based on the change events. The bounded list generated by the distributed sink component 170 may indicate a sequential list of the transactions and, for each respective transaction processed for each partition, a start boundary for the respective transaction, the change events associated with the respective transaction, and an end boundary for the respective transaction. Specifically, a "Transaction_start" event is published in the bounded list when a new transaction begins, and change events (e.g., associated with a specific company or "companyId") are directed to a specific partition using predefined partitioning logic. When a new transaction intended for the same partition starts, a corresponding "Transaction_end" event for the previous transaction is published in the bounded list, thereby ensuring a clear transition between transactions within the same partition. The bounded list may also maintain an indication of the partition in which the transaction is being processed, such as to maintain consistent partitioning into the target queue 180. Furthermore, in some instances, the local map in each sink component instance may operate as a cache where the partition serves as the key and the corresponding value is the last transaction processed from that partition. To prevent two or more sink component instances from submitting end boundaries for a same transaction, when the sink components instances undergo rebalancing (as described above), each sink component instance inspects its cache and clears any partitions that have been reassigned to other sink component instances, thereby ensuring that partitions are mutually exclusive between sink component instances. In these and other manners, the bounded list output from the distributed sink component 170 chronologically orders the corresponding transactions (e.g., per partition) across all sink component instances. As each transaction is associated with a specific sequence of change events, the bounded list ensures that these events remain grouped together, with a defined start and end boundary for each transaction, thereby maintaining the consistency and integrity of transaction processing across the distributed system.

Each given sink component instance of the distributed sink component 170 may generate its corresponding portions of the bounded list based in part on determining, for each respective partition mapped to the given sink component instance, a most recently processed transaction for the respective partition. Specifically, each sink component instance monitors change events as they arrive for each partition. For every current change event, the sink component instance compares it with the prior event processed for the same partition to determine if the current event is part of a new transaction. If the current change event is associated with a different transaction than the prior change event, it is determined that the transaction associated with the prior event is the most recently processed transaction for that partition. Once the sink component instance identifies that a new transaction has begun, the bounded list is updated accordingly. Specifically, an end boundary for the transaction associated with the prior change event is inserted into the bounded list and a start boundary for the transaction associated with the current change event is also inserted into the bounded list.

In a simplified non-limiting example, there are three sink component "Instances" (A, B, and C) handling Partitions 1, 2, and 3, respectively. For this example: Instance A processes events for Partition 1 and identifies that Change Event 1 belongs to Transaction 1001 and Change Event 2 belongs to Transaction 1002; Instance B processes Partition 2, and similarly, detects a transition between Transaction 2001 and 2002 as it handles Change Event 3 and Change Event 4; and Instance C handles Partition 3, detecting a new Transaction 3001 with Change Event 5. Accordingly, Instance A inserts an end boundary for Transaction 1001 and a start boundary for Transaction 1002 in the bounded list, and so on for Instances B and C. In this way, each sink component instance automatically manages the partitions it is responsible for, identifies transitions between transactions, and updates the bounded list with start and end boundaries for each sequence of change events associated with a particular transaction, thereby ensuring that the bounded list provides a consistent, ordered view of all transactions across the distributed system. Upon generating the bounded list, the distributed sink component 170 may partition the bounded list into corresponding partitions of the target queue 180.

The target queue 180 includes a plurality of partitions (e.g., the same number of partitions as the staging queue 150) into which the change events (in addition to the start and end boundaries) from the bounded list are split or partitioned. Similar to the staging queue 150, change events associated with a same unique identifier are stored in a same partition (e.g., based on the hashing modulus operation described above). The staging queue 150 may operate as an intermediary layer that temporarily holds the change events from the distributed sink component 170 until they are consumed downstream, such as by the data repository 188. In some implementations, the target queue 180 is a Kafka target (or "final") topic divided into partitions for parallel processing. In various implementations, alternatives to Kafka may include RabbitMQ, AWS Simple Queue Service (SQS), Azure Event Grid, or any other messaging system. For purposes of discussion herein, the target queue 180 may also be referred to as a message queue, a message broker, event stream, or another suitable term for a component that stores and delivers messages or a continuous flow of events.

A simplified example bounded list output from the distributed sink component 170 assigning the transactions (T) and their corresponding change events (e) into various of the partitions (P) of the target queue 180 based on the unique identifiers (c) may be "P0→T1_start, c1e1, c1e2, . . . , c1e40, T1_end, c2e1, T2_start, c2e2, . . . , c2e560322, T2_end; P1→T3_start, c3e1, c3e2, . . . , c3e123040, T3_end, T4_start, c4e1, c4e2, . . . , c4e100, T4_end; . . . P49->T903423_start, c100e1, c100e2, . . . , c100e47238, T903423_end, T903424_start, c101e1, c101e2, . . . , c101e53409, T903424_end," thereby bounding the transactions. The target queue 180 may be used to provide the bounded transactions to a data repository (e.g., the data repository 188).

In some implementations, a data repository (e.g., the data repository 188) stores data associated with bounded transactions, such as the bounded transactions themselves, which may be provided by the target queue 180 via the bounded list. As described above with respect to the replay store 160, the change events may also be stored in the replay store 160 in-sync (and in partitions corresponding) with the change events stored in the staging queue 150. As also described above, the bounded list generated by the distributed sink component 170 is partitioned into corresponding partitions of the target queue 180. Accordingly, if errors are detected in any partition of the target queue 180 (e.g., such as based on notifications received downstream), a replay mechanism may be triggered for a timeframe relevant to the detected errors. The replay mechanism may include retrieving the corresponding change events from the replay store 160 based on the timeframe, thereby ensuring that relevant data is replayed. The retrieved events may then be again partitioned into corresponding partitions of the staging queue 150 for further processing. Thereafter, the distributed sink component 170 repairs the erroneous portions of the bounded list using the replayed events. After the repair, the updated bounded list is repartitioned into the appropriate partitions of the target queue 180, thereby ensuring that the target queue 180 reflects the correct state.

As a non-limiting example implementation where the system 100 is a healthcare system used to manage electronic health records (EHRs) for a large healthcare provider, each transaction in the bounded list may represent a patient's interaction with the healthcare system. An interaction may include a hospital visit, a telehealth appointment, a prescription refill request, or a lab result update. Accordingly, each bounded transaction may encompass numerous change events such as a patient's vital signs being recorded, a diagnosis being added, a medication being prescribed, or a lab test being ordered. Given the volume of data (e.g., billions of change events per day generated by millions of users) the system 100 continuously partitions patient records into partitions based on their unique identifiers. Furthermore, each change event is also synced in the replay store 160. For this example, if an error is detected in a particular partition (e.g., related to patients within a particular geographic region and insurance provider), the system 100 will first determine a specific time window (e.g., a 24-hour period) associated with the detected error. The system 100 may then trigger a replay event for that partition and time window. Accordingly, the relevant change events for that partition and time window may be retrieved from the replay store 160, thereby minimizing latency and impact caused by the error. Using the replayed change events, the system 100 repairs the corresponding records by applying corrective logic based on the accurate information, and the repaired records are re-integrated into the appropriate partition.

In various implementations, the data repository 188 may be any repository structure suitable for efficient querying and analysis of transactional data, such as for real-time monitoring and/or historical trend analysis. In some instances, the data repository 188 is a data warehouse or another suitable data store that serves as a central repository for historical transactional data and that may be integrated with one or more other data sources. For instance, the data warehouse may include one or more data marts coupled to one or more reporting applications. The one or more reporting applications may use the data mart for generating reports, dashboards, visualizations, and the like, thereby enabling users to gain insights into various metrics (e.g., key performance indicators (KPIs)) associated with the change events and to make informed decisions based on the metrics. Notably, by using the various innovative techniques described herein, end-users may be enabled to use the reporting applications to generate accurate reports, dashboards, visualizations, and the like, based on change events that occurred no longer than 10 seconds in the past (i.e., a 10 second Service Level Agreement (SLA) may be honored), even when the number of daily change events is billions or more and the number of users generating the change events is millions or more. For instance, trackable change events (e.g., item crafting, spell casting, quest updates) generated by players in a global MMORPG may all contribute to real-time data analysis during a large-scale player gathering, such that end-users providing the global MMORPG may instantly visualize the most active play areas and adjust resource allocation strategies based on up-to-the-second data to maximize player satisfaction and engagement. In addition, the change events, when accurately and efficiently bounded into corresponding transactions in the data repository 188 using the innovative techniques described herein, may also enable a source of truth for auditing and compliance purposes (e.g., transaction history), instantaneous training data for machine learning models, real-time fraud detection, predictive analytics, or the like.

The source database 134, the source component 140, the staging queue 150, the replay store 160, the distributed sink component 170, the target queue 180, and/or the data repository 188 are implemented in software, hardware, or a combination thereof. In some implementations, any one or more of the source database 134, the source component 140, the staging queue 150, the replay store 160, the distributed sink component 170, the target queue 180, or the data repository 188 is embodied in instructions that, when executed by the processor 110, cause the computing system 100 to perform operations. In various implementations, the instructions of one or more of said components and/or the interface 120 are stored in the memory 114, the database 130, or a different suitable memory, and are in any suitable programming language format for execution by the computing system 100, such as by the processor 110. It is to be understood that the particular architecture of the computing system 100 shown in FIG. 1 is but one example of a variety of different architectures within which aspects of the present disclosure can be implemented. For example, in some implementations, components of the computing system 100 are distributed across multiple devices, included in fewer components, and so on. While the below examples related to bounding transactions are described with reference to the computing system 100, other suitable system configurations may be used.

Figure 2:
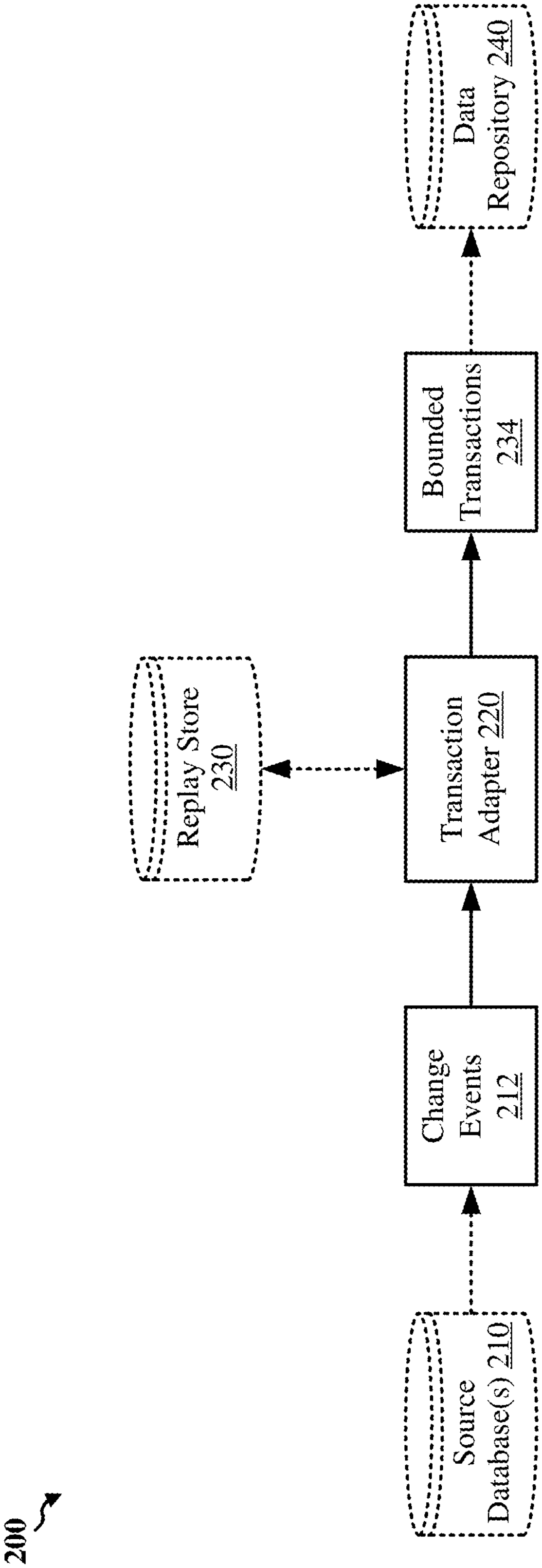
FIG. 2 shows an example process flow for bounding transactions, according to some implementations.

FIG. 2 shows an example process flow 200 for bounding transactions, according to some implementations, and may be performed by a computing system, such as the computing system 100 described with respect to FIG. 1. The example process flow 200 shows a source database 210, a transaction adapter 220, a replay store 230, and a data repository 240. The source database 210, the replay store 230, and the data repository 240 may be examples of the source database 134, the replay store 160, and the data repository 188 described with respect to FIG. 1, respectively. In some implementations, the transaction adapter 220 includes various subcomponents, such as a source component, a staging queue, a distributed sink component, and a target queue, which may be examples of the source component 140, the staging queue 150, the distributed sink component 170, and the target queue 180 described with respect to FIG. 1, respectively. In some other implementations, the transaction adapter 220 may also include the replay store 230. In yet other implementations, one or more other components described with respect to FIG. 1 may be subcomponents of the transaction adapter 220.

The example process flow 200 starts with obtaining change events 212 at transaction adapter 220. In some instances, the transaction adapter 220 obtains the change events 212 from a transmission received over a communications network from the source database 210. In some implementations, the change events 212 are synced in the replay store 230. The example process flow 200 continues with the transaction adapter 220 using the various innovative techniques disclosed herein to generate bounded transactions 234 based on the change events 212. In some implementations, the bounded transactions 234 are stored in the data repository 240. In some instances, one or more of the change events 212 may be replayed from the replay store 230 based on detecting one or more errors in the bounded transactions 234 downstream, such as in a target queue of the transaction adapter 220, in the data repository 240, or further downstream.

Figure 3:
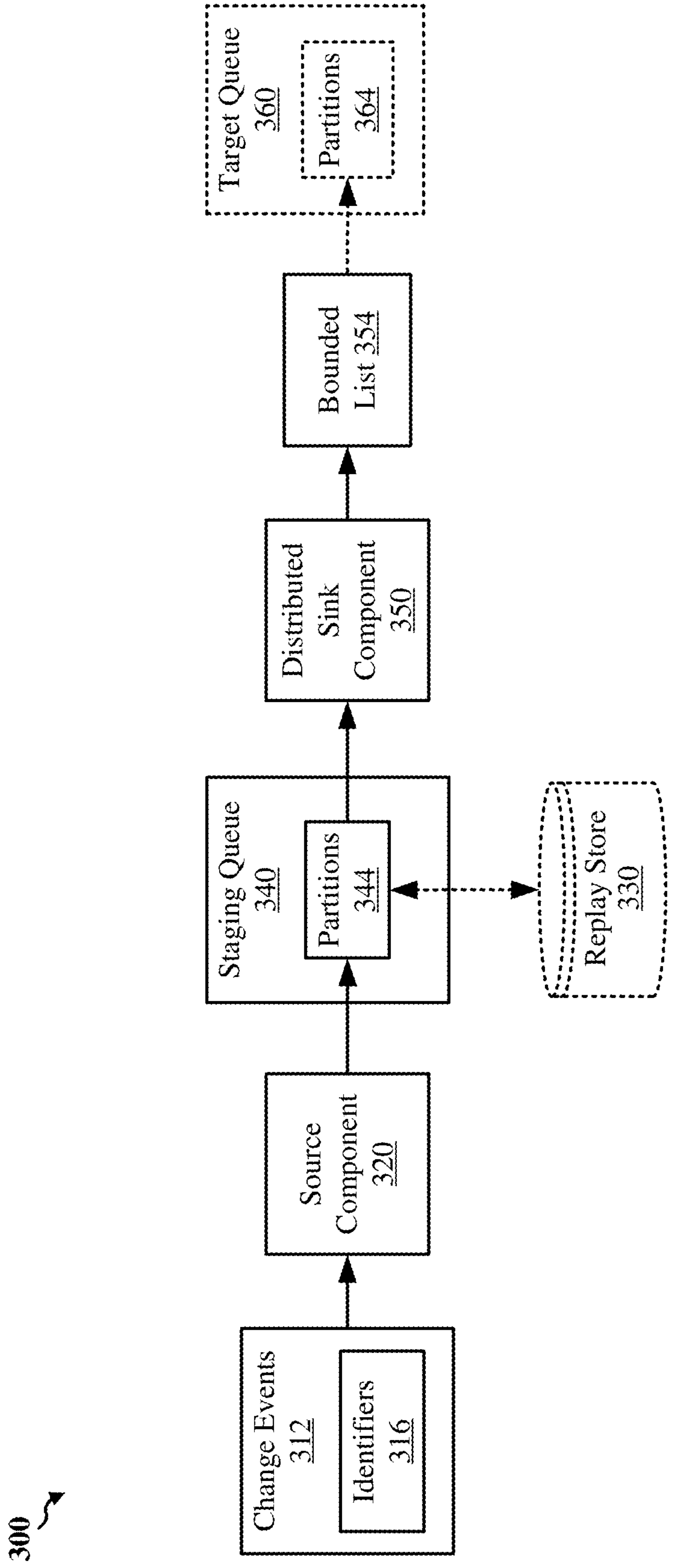
FIG. 3 shows an example process flow for bounding transactions, according to some implementations.

FIG. 3 shows an example process flow 300 for bounding transactions, according to some implementations, and may be performed by a computing system, such as the computing system 100 described with respect to FIG. 1. The example process flow 300 shows a source component 320, a replay store 330, a staging queue 340, a distributed sink component 350, and a target queue 360, which may be examples of the source component 140, the replay store 230, the staging queue 150, the distributed sink component 170, and the target queue 180 described with respect to FIGS. 1 and 2, respectively.

The example process flow 300 starts with obtaining, at the source component 320, a set of change events 312, which may be an example of the change events 212 described with respect to FIG. 2. Each change event of the change events 312 may be associated with one of a plurality of identifiers 316, such as the unique identifiers described with respect to FIG. 1. Each change event may also be associated with one of a plurality of transactions, such as described with respect to FIG. 1.

The example process flow 300 continues with partitioning, using the source component 320, the change events 312 into a plurality of partitions 344 of the staging queue 340. The partitioning may be based on the unique identifiers, as described with respect to FIG. 1. In some implementations, the change events 312 are synced in the replay store 330.

The example process flow 300 continues with generating, using the distributed sink component 350, a bounded list 354, such as in the manners described with respect to FIG. 1. In some aspects, the distributed sink component 350 parallelly processes the change events 312 from the staging queue 340. The bounded list 354 may indicate, for each respective transaction processed for each of the partitions 344, a start boundary for the respective transaction, the ones of the change events 312 associated with the respective transaction, and an end boundary for the respective transaction. In some implementations, the distributed sink component 350 partitions the bounded list 354 into partitions 364 of the target queue 360. The partitions 364 may correspond to the partitions 344, as described with respect to FIG. 1.

Figure 4:
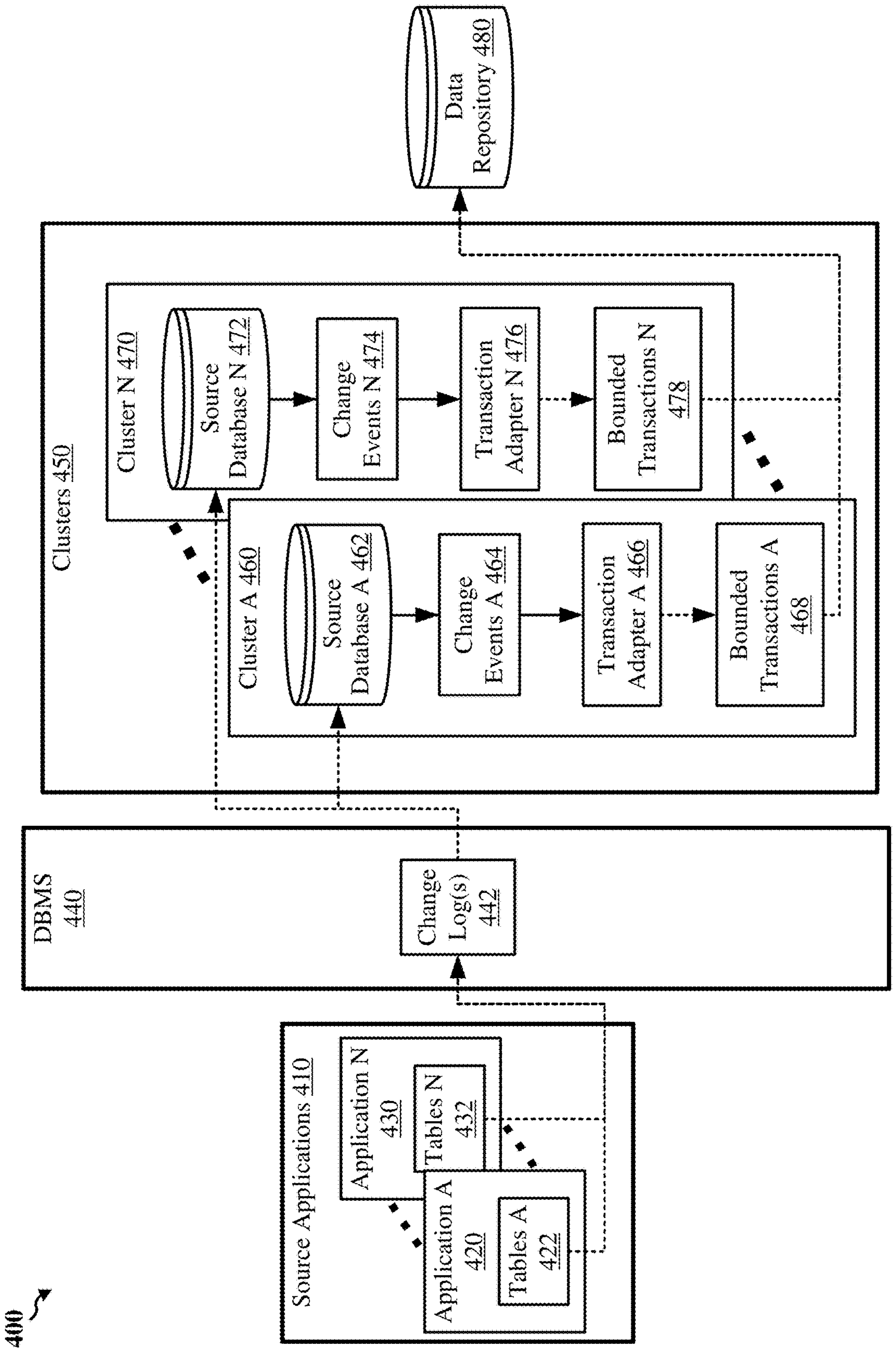
FIG. 4 shows an example process flow for obtaining change events, according to some implementations.

FIG. 4 shows an example process flow 400 for obtaining change events, according to some implementations, and may be performed by a computing system, such as the computing system 100 described with respect to FIG. 1. The example process flow 400 shows a data repository 480, which may be an example of the data repository 240 described with respect to FIG. 2.

The example process flow 400 shows a change log 442 generated by a database management system (DBMS) 440 serving any number of source applications 410 (application A 420 . . . application N 430). In some instances, the DBMS 440 is an example of the database 130 described with respect to FIG. 1. The DBMS 440 may automatically generate the change log 442 based on any number of changes made to any number of tables (tables A 422 . . . tables N 432) used by the source applications 410, such as in the manners described with respect to FIG. 1. The DBMS 440 may manage any number of clusters 450 (cluster A 460 . . . cluster N 470), where each of the clusters 450 has its own respective source database (source database A 462 . . . source database N 472) and transaction adapter (transaction adapter A 466 . . . transaction adapter N 476). Each source database may be an example of the source database 210 described with respect to FIG. 2. In various implementations, each transaction adapter may be an example of the transaction adapter 220 described with respect to FIG. 2 and may include various of the subcomponents described with respect to FIG. 3, such as the source component 320, the staging queue 340, the distributed sink component 350, and in various implementations, the replay store 330 and/or the target queue 360.

As shown in FIG. 4, each source database of each cluster may extract a respective set of change events (change events A 464 . . . change events N 474) from its respective source database. Each set of change events may be an example of the change events 312 described with respect to FIG. 3. The respective transaction adapter of each cluster may be used to bound a respective plurality of transactions associated with its respective set of change events, where each transaction of each respective plurality of transactions is associated with a subset of the respective set of change events associated with the changes made to the tables distributed across the plurality of source applications 410. For example, transaction adapter A 466 of cluster A 460 may be used to generate bounded transactions A 468 based on change events A 464 (which may be associated with any subset of changes made to any combination of the tables distributed across any combination of the source applications 410), and transaction adapter N 476 of cluster N 470 may be used to generate bounded transactions N 478 based on change events N 474 (which also may be associated with any subset of changes made to any combination of the tables distributed across any combination of the source applications 410). In some implementations, the bounded transactions (bounded transactions A 468 . . . bounded transactions N 478) may be stored in the data repository 480.

Figure 5:
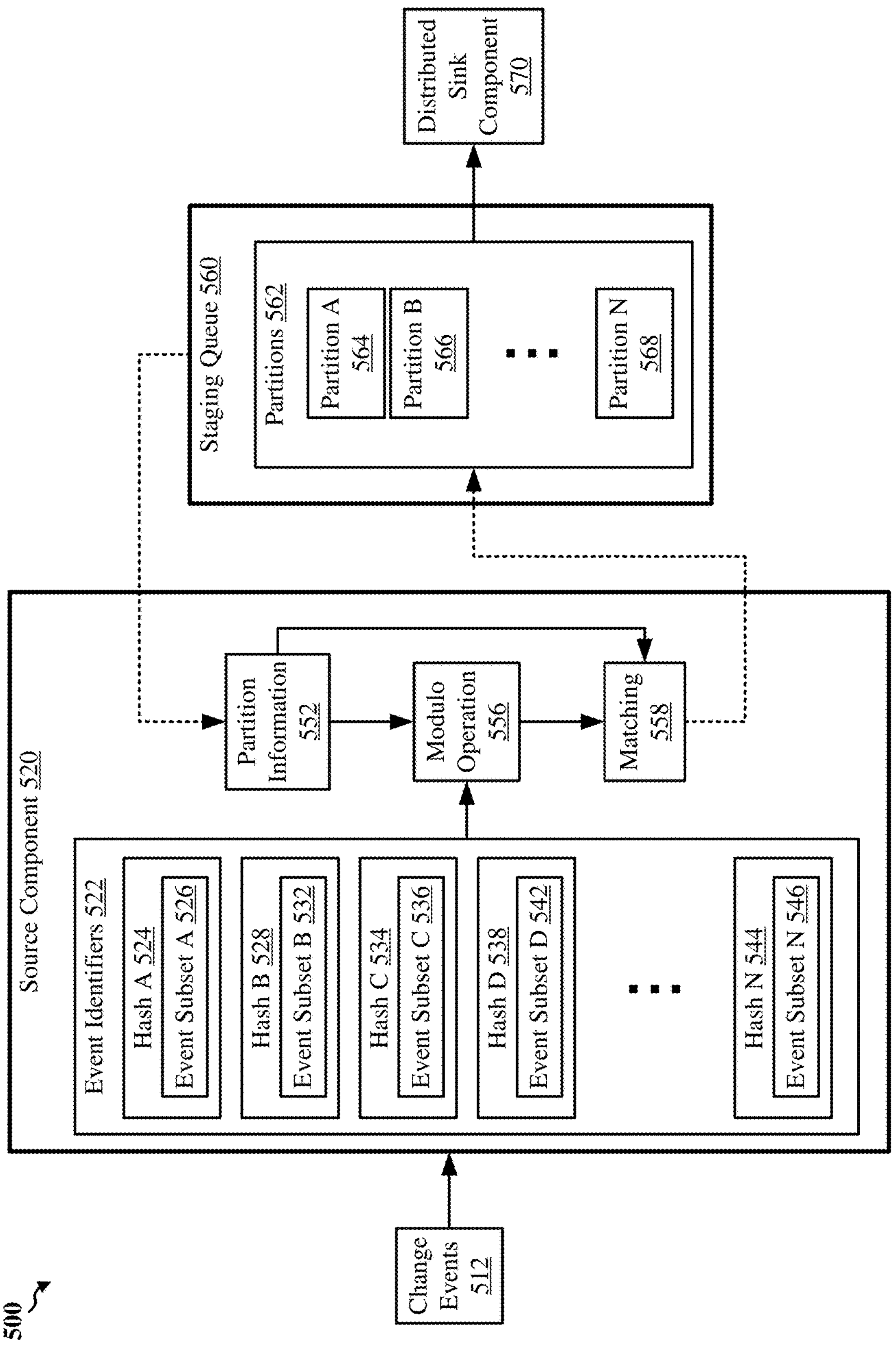
FIG. 5 shows an example process flow for partitioning change events, according to some implementations.

FIG. 5 shows an example process flow 500 for partitioning change events, according to some implementations, and may be performed by a computing system, such as the computing system 100 described with respect to FIG. 1. The example process flow 500 shows a source component 520, a staging queue 560, and a distributed sink component 570, which may be examples of the source component 320, the staging queue 340, and the distributed sink component 350, described with respect to FIG. 3, respectively.

The example process flow 500 starts with obtaining change events 512 at source component 520. The change events 512 may be an example of any one of the change events (change events A 464 . . . change events N 474) described with respect to FIG. 4. Each of the change events 512 may be associated with an event identifier 522. The event identifiers 522 may be an example of the identifiers 316 described with respect to FIG. 3. Each of the event identifiers 522 may be one of any number of unique hash values (hash A 524, hash B 528, hash C 534, hash D 538, . . . hash N 544). Each unique hash value may be generated using a hash function on a selected identifier for an entity associated with a corresponding subset of the change events 512 (event subset A 526, event subset B 532, event subset C 536, event subset D 542, . . . event subset N 546). As a non-limiting example, the ones of the change events 512 included in event subset B 528 may have each been executed by a user identified by userID TechLabsNation, and hash B 528 (e.g., e5c43b5f . . . ) may have been generated using the hash function on the userID TechLabsNation.

The example process flow 500 continues with partitioning, using the source component 520, the change events 512 into any number of partitions 562 (partition A 564, partition B 566, . . . partition N 568) of the staging queue 560. In some implementations, each of the partitions 562 is associated with a unique partition identifier, which may be provided to the source component 520 in partition information 552. In some instances, the partition information 552 may also include a total number of the partitions 562 (e.g., 50). The partitioning may be based on the event identifiers 522. As a non-limiting example, partitioning a given change event of the event subset B 532 may include performing a modulo operation 556 on hash B 528 (e.g., e5c43b5f . . . ) and the total number of the partitions (e.g., 50), such as in the manners described with respect to FIG. 1. A result of the modulo operation 556 may be matched with one of the unique identifiers for the partitions 562. For this example, at matching 558, hash B 528 is matched to an identifier for partition N 568. Thus, the given change event and any subsequent change events associated with hash B 528 are partitioned into partition N 568 (e.g., without the need to perform another modulo operation for change events associated with hash B 528). In this manner, change events associated with a same one of the event identifiers 522 are consistently partitioned into a same one of the partitions 562. The partitioning may continue for as long as change events 512 are obtained at the source component 520 (e.g., indefinitely).

Figure 6:
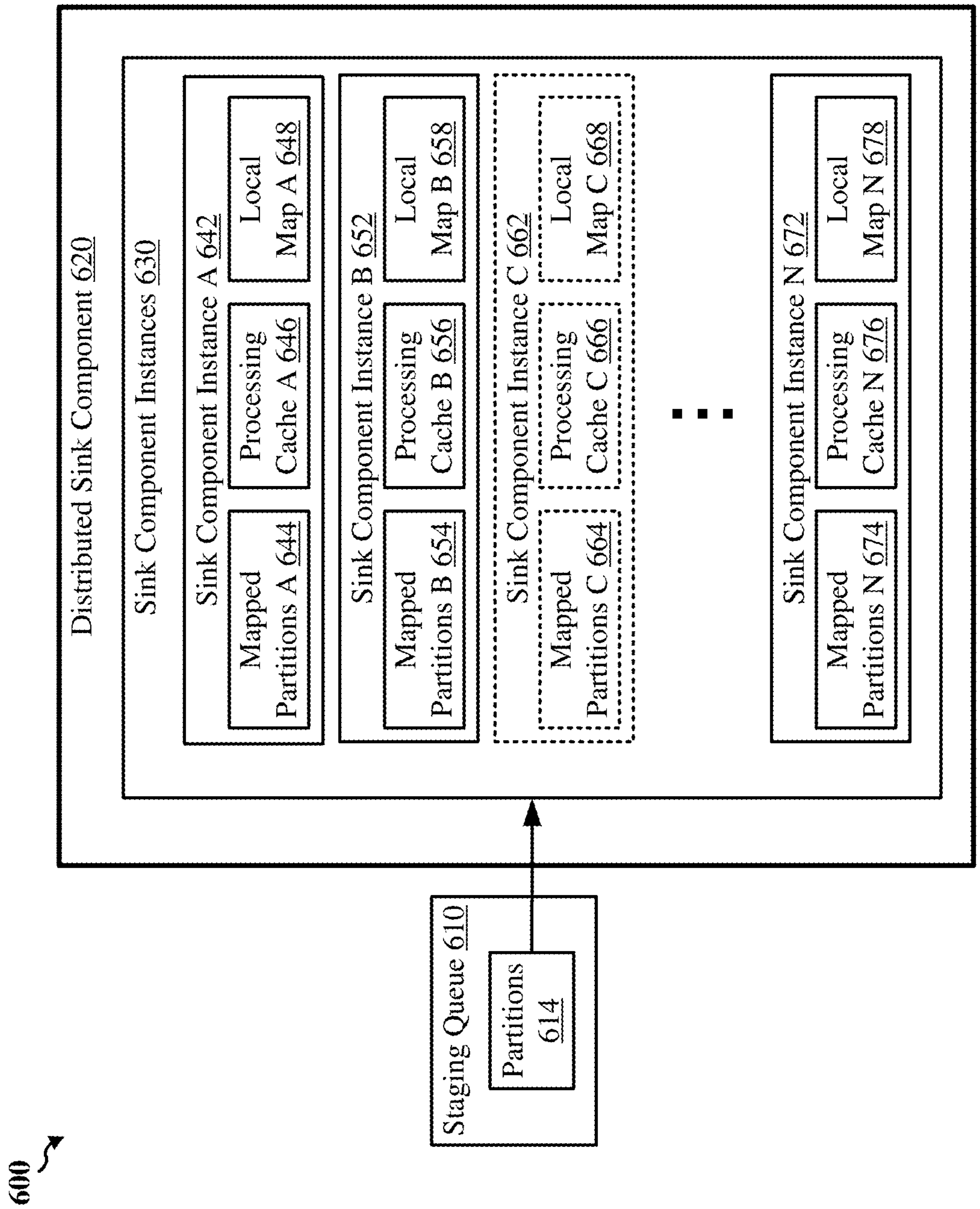
FIG. 6 shows an example process flow for parallelly processing change events, according to some implementations.

The example process flow 500 continues with using the distributed sink component 570 to parallelly process the change events 512 from the partitions 562 of the staging queue 560, as described in more detail with respect to FIG. 6.

FIG. 6 shows an example process flow 600 for parallelly processing change events, according to some implementations, and may be performed by a computing system, such as the computing system 100 described with respect to FIG. 1. The example process flow 600 shows a staging queue 610 and a distributed sink component 620, which may be examples of the staging queue 560 and the distributed sink component 570 described with respect to FIG. 5, respectively.

The example process flow 600 shows the distributed sink component 620 parallelly processing change events from partitions 614 of the staging queue 610. The partitions 614 and the change events may be an example of the partitions 562 and the change events 512 described with respect to FIG. 5, respectively. The distributed sink component 620 may include any number of sink component instances 630 (sink component instance A 642, sink component instance B 652, sink component instance C 662, . . . sink component instance N 672). In distributing the change events to the distributed sink component 620, the staging queue 610 may define an even distribution of the partitions 614 across the sink component instances 630 such that a difference between each number of partitions mapped to each sink component instance (e.g., mapped partitions A 644, mapped partitions B 654, mapped partitions C 664, . . . mapped partitions N 674) is minimized, such as in the manners described with respect to FIG. 1. In some implementations, each respective sink component instance also maintains a local map (e.g., local map A 648, local map B 658, local map C 668, . . . local map N 678) indicating a subset of the partitions 614 to which the respective sink component instance is mapped, where each local map is a key-value pair data structure. Furthermore, each of the sink component instances 630 includes a processing cache (processing cache A 646, processing cache B 656, processing cache C 666, . . . processing cache N 676) used for temporarily storing data associated with change events and their corresponding transactions in process of being bounded.

In some instances, the system 100 determines that one of the sink component instances 630 has become unavailable, such as in the manners described with respect to FIG. 1. For the example shown in FIG. 6, it is determined that sink component instance C 662 has become unavailable. For this example, upon said determination, the system 100 redistributes the mapped partitions C 664 to the remaining sink component instances (e.g., sink component instance A 642, sink component instance B 652, sink component instance D (not shown for simplicity) . . . sink component instance N 672), such as in the manners described with respect to FIG. 1. Thereafter, the system may detect that sink component instance C 662 has resumed processing and thus rebalance the distribution of the partitions 614 to account for sink component instance C 662 resuming processing, such as in the manners described with respect to FIG. 1. In such instances, the system 100 may determine a difference between the partitions mapped to each respective sink component instance before mapped partitions C 664 were redistributed and the partitions mapped to the respective sink component instance after mapped partitions C 664 were redistributed, such as in the manners described with respect to FIG. 1. Based on the determined differences, the system 100 may determine which of the change events were duplicatively processed by each sink component instance and clear the identified duplicatively processed change events from the corresponding processing caches, such as in the manners described with respect to FIG. 1.

Figure 7:
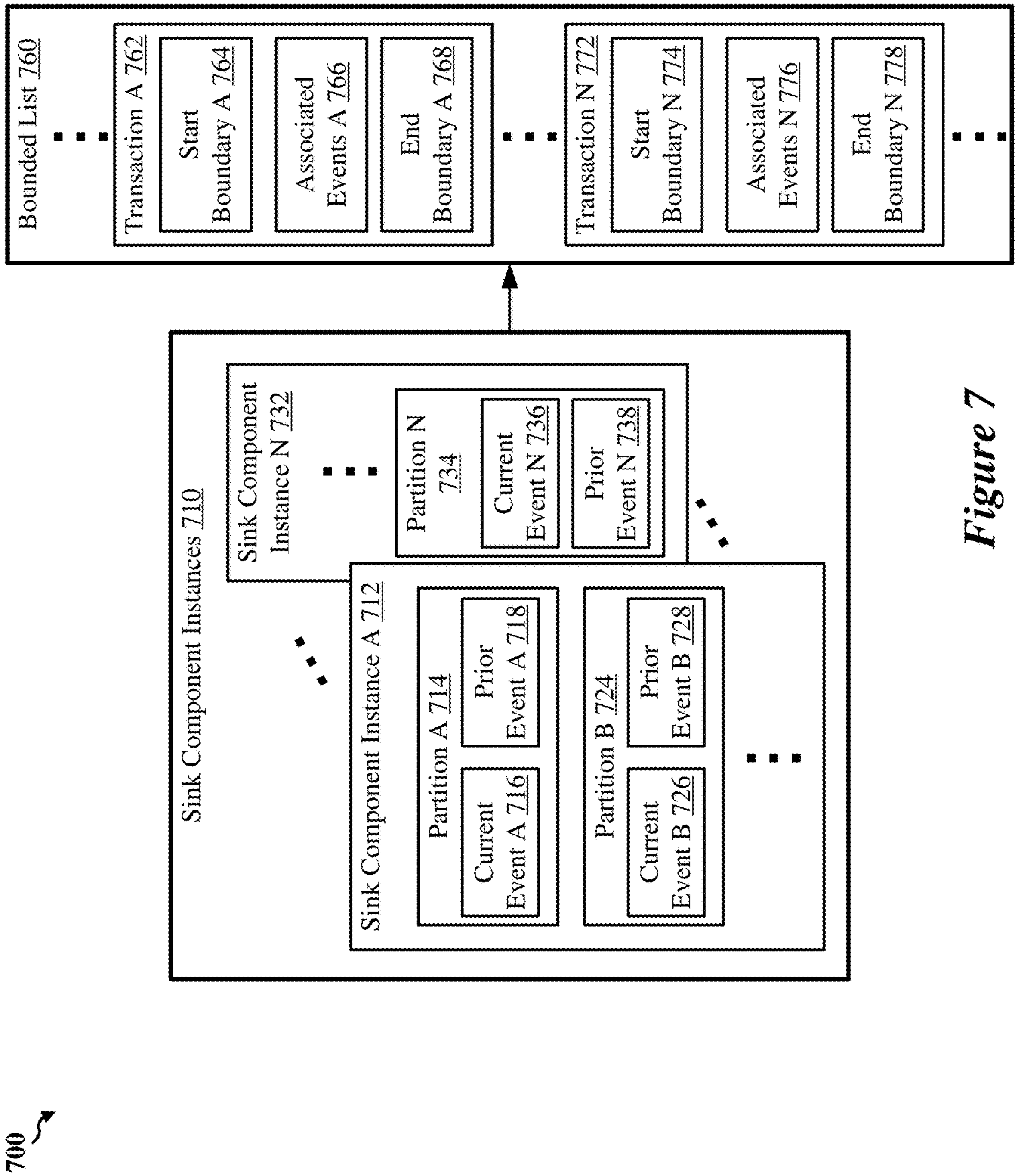
FIG. 7 shows an example process flow for parallelly processing change events and generating a bounded list, according to some implementations.

FIG. 7 shows an example process flow 700 for parallelly processing change events and generating a bounded list, according to some implementations, and may be performed by a computing system, such as the computing system 100 described with respect to FIG. 1. The example process flow 700 shows sink component instances 710, which may be an example of the sink component instances 630 described with respect to FIG. 6.

The sink component instances 710 may include any number of sink component instances (sink component instance A 712 . . . sink component instance N 732), and each sink component instance may be mapped to any number of partitions, such as described with respect to the partitions 614 of FIG. 6. For ease of illustration, FIG. 7 shows that sink component instance A 712 is mapped to at least partition A 714 and partition B 724, and that sink component instance N 732 is mapped to at least partition N 734. As part of the transaction bounding process, a most recently processed transaction is consistently determined for each respective partition, such as based on tracking a most recently processed change event (prior event A 718, prior event B 728, . . . prior event N 738) for the respective partition and a change event currently being processed (current event A 716, current event B 726, . . . current event N 736) for the respective partition. As a non-limiting example, determining the most recently processed transaction for partition B 724 may include determining whether current event B 726 is associated with a different transaction than prior event B 728. It will be understood that current event B 726 and prior event B 728 will change each time sink component instance A 712 advances to the next sequential change event in partition B 724. Upon determining that the transaction associated with current event B 726 (for example, Transaction849234) is different than the transaction associated with prior event B 728 (for example, Transaction849126), it is determined that Transaction849126 is the most recently processed transaction for partition B 724. Thereafter, for as long as current event B 726 is associated with Transaction849234, Transaction849126 will be known as the most recently processed transaction for partition B 724.

Each of the sink component instances 710 may contribute bounded transactions to a bounded list 760, such as in the manners described with respect to FIG. 1. The bounded list 760 may be an example of the bounded list 354 described with respect to FIG. 3. For the non-limiting example described above, upon determining that Transaction849126 is the most recently processed transaction for partition B 724, sink component instance A 712 may insert, in a field associated with partition B 724 in the bounded list 760 (not shown for simplicity), an end boundary for Transaction849126 (e.g., following the associated prior event B 728) and a start boundary for Transaction849234 (e.g., followed by the associated current event B 726). In this manner, the sink components instances 710 bound transactions in the bounded list 760, where any number of bounded transactions (e.g., transaction A 762 . . . transaction N 772, indefinitely) each includes a start boundary for the transaction (e.g., start boundary A 764 . . . start boundary N 774), followed by the events associated with the transaction (e.g., associated events A 766 . . . associated events N 776), followed by an end boundary for the transaction (e.g., end boundary A 768 . . . end boundary N 778).

Figure 8:
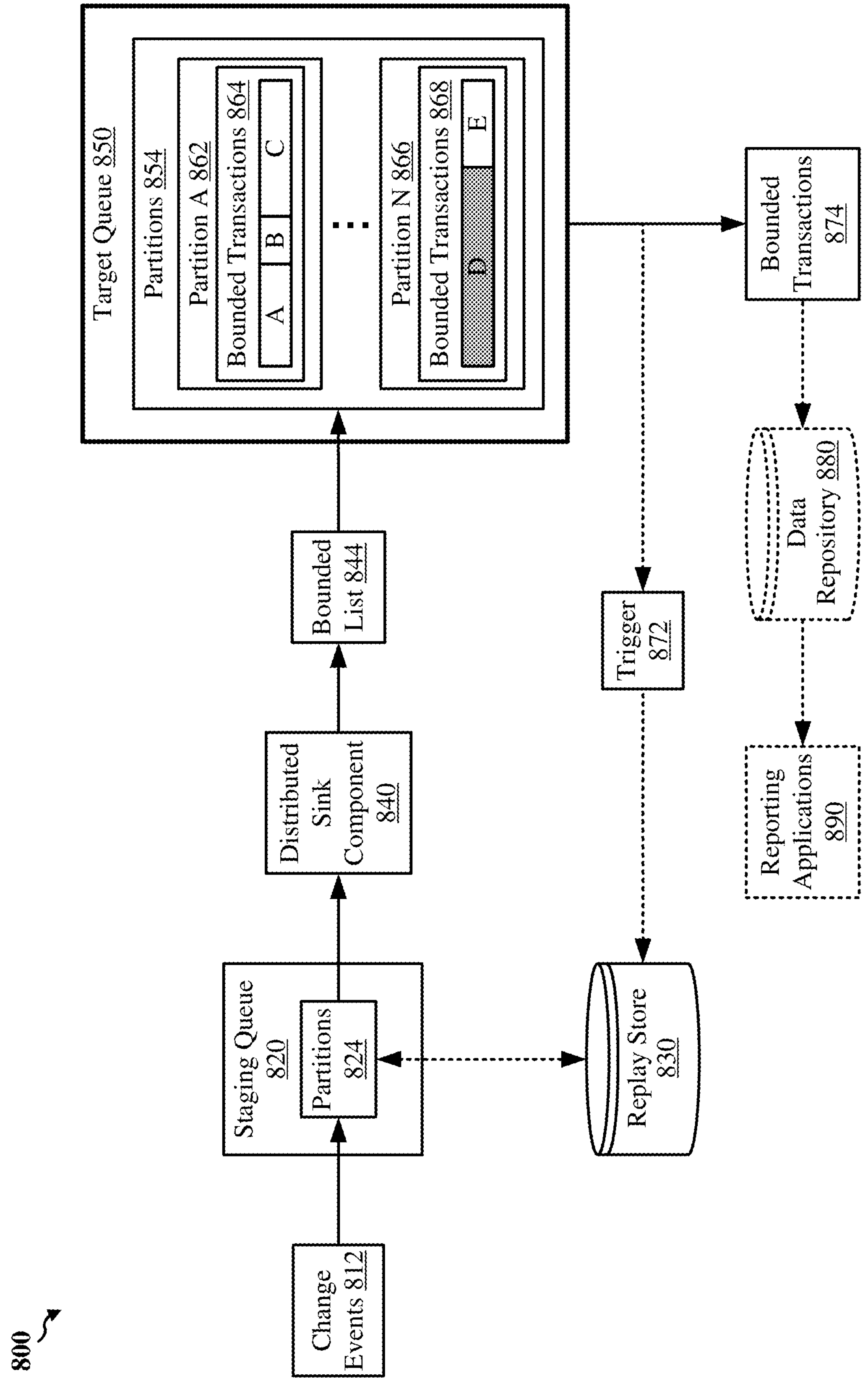
FIG. 8 shows an example process flow for a replay mechanism and partitioning a bounded list, according to some implementations.

FIG. 8 shows an example process flow 800 for a replay mechanism and partitioning a bounded list, according to some implementations, and may be performed by a computing system, such as the computing system 100 described with respect to FIG. 1. The example process flow 800 shows a staging queue 820, a replay store 830, a distributed sink component 840, a target queue 850, and a data repository 880, which may be examples of the staging queue 610 of FIG. 6, the replay store 330 of FIG. 3, a distributed sink component (e.g., the distributed sink component 620 of FIG. 6) including a plurality of sink component instances (e.g., the sink component instances 710 of FIG. 7), the target queue 360 of FIG. 3, and the data repository 480 of FIG. 4.

The example process flow 800 starts with change events 812 being partitioned into partitions 824 of the staging queue 820. The change events 812 and the partitions 824 may be examples of the change events 512 and the partitions 562 described with respect to FIG. 5, respectively. In some implementations, the change events 812 are stored in the replay store 830, which is communicably coupled to the staging queue 820. The example process flow 800 continues with the distributed sink component 840 parallelly processing the change events 812 in the partitions 824, such as described with respect to the partitions 614 of FIG. 6. The example process flow 800 continues with the distributed sink component 840 generating a bounded list 844, such as described with respect to the bounded list 760 of FIG. 7.

The example process flow 800 continues with the distributed sink component 840 partitioning the bounded list 844 into corresponding partitions 854 of the target queue 850. The partitions 854 may include any number of partitions (partition A 862 . . . partition N 866) and may be an example of the partitions 364 described with respect to FIG. 3. In some implementations, each bounded transaction is stored in one of the partitions 854 matching a corresponding one of the partitions 824. As a non-limiting example, change events from a particular partition (for example, Partition36) of the partitions 824 in the staging queue 820 will be bounded within associated transactions in a matching partition (for this example, Partition36) of the partitions 854 in the target queue 850. Each of the partitions 854 may include any number of bounded transactions. For the simplified example of FIG. 8, partition A 862 includes bounded transactions 864 (Transaction A, Transaction B, and Transaction C), and partition N 866 includes bounded transactions 868 (Transaction D and Transaction E). The bounded transactions from all of the partitions 854 (illustrated as bounded transactions 874) may be provided by the target queue 850 to the data repository 880, such as in the manners described with respect to FIG. 1. In some implementations, the data repository 880 is a data warehouse including a data mart coupled to one or more reporting applications 890, as described with respect to FIG. 1.

In some instances, one or more errors may be detected among the bounded transactions, such as in the bounded transactions 874, in the bounded list 844, or in the bounded transactions stored in the partitions 854. For the example of FIG. 8, an error is detected in Transaction D stored in partition N 866 of the target queue 850. For this example, upon the error being detected, the system 100 identifies a timeframe relevant to the detected error (e.g., based on timestamps and/or metadata associated with transaction D), and the target queue 850 (or an associated subcomponent) transmits a trigger 872 to the replay store 830 (and/or the staging queue 820) such that a replay mechanism is triggered for the identified timeframe. During the replay mechanism, the ones of the change events 812 corresponding to partition N 866 for the identified timeframe are retrieved from the replay store 830 and repartitioned into the corresponding partitions (a matching partition N, for this example) in the staging queue 820. Thereafter, the distributed sink component 840 repairs one or more portions of the bounded list 844 based on the repartitioned ones of the change events 812, and the repaired bounded list 844 is repartitioned into the corresponding partitions (partition N 866, for this example) of the target queue 850.

Figure 9:
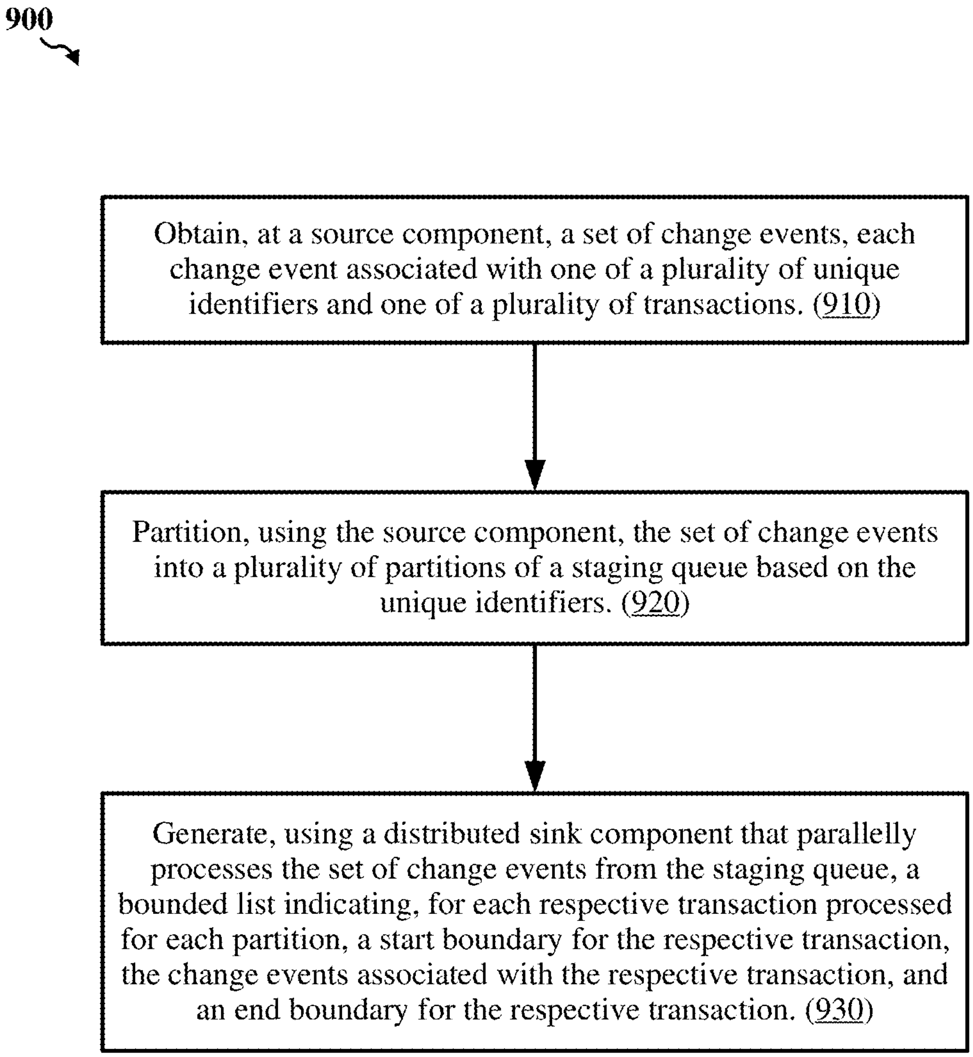
FIG. 9 shows an illustrative flowchart depicting an example operation for bounding transactions, according to some implementations.

FIG. 9 shows an illustrative flowchart 900 depicting an example operation for bounding transactions, according to some implementations, and may be performed by one or more processors of a computing system, such as the computing system 100 described with respect to FIG. 1. For example, at block 910, the computing system 100 obtains, at a source component of the computing system 100, a set of change events, each change event associated with one of a plurality of unique identifiers and one of a plurality of transactions. At block 920, the computing system 100 partitions, using the source component, the set of change events into a plurality of partitions of a staging queue of the computing system 100 based on the unique identifiers. At block 930, the computing system 100 generates, using a distributed sink component of the computing system 100 that parallelly processes the set of change events from the staging queue, a bounded list indicating, for each respective transaction processed for each partition, a start boundary for the respective transaction, the change events associated with the respective transaction, and an end boundary for the respective transaction.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for bounding transactions performed by one or more processors of a computing system and comprising:

obtaining, at a source component of the computing system, a set of change events, each change event associated with one of a plurality of unique identifiers and one of a plurality of transactions, wherein the obtaining includes extracting the set of change events from a source database, and wherein the source database is one of a plurality of source databases managed by a database management system (DBMS) serving a plurality of source applications;

partitioning, using the source component, the set of change events into a plurality of partitions of a staging queue of the computing system based on the unique identifiers; and generating, using a distributed sink component of the computing system that parallelly processes the set of change events from the staging queue, a bounded list indicating, for each respective transaction processed for each partition, a start boundary for the respective transaction, the change events associated with the respective transaction, and an end boundary for the respective transaction.

2. The method of claim 1, wherein the set of change events is extracted from a change log generated by the DBMS based on changes made to tables used by the plurality of source applications.

3. The method of claim 2, wherein each transaction of the plurality of transactions is associated with a subset of the change events associated with changes made to the tables distributed across the plurality of source applications.

4. The method of claim 1, wherein partitioning the set of change events includes:

partitioning change events associated with a same unique identifier into a same partition.

5. The method of claim 4, wherein each of the plurality of unique identifiers is a hash value generated using a hash function on a selected identifier for an entity associated with the corresponding change event.

6. The method of claim 5, wherein each of the plurality of partitions is associated with a unique partition identifier, and wherein partitioning a given change event includes:

performing a modulo operation on the hash value and a total number of the partitions;

matching a result of the modulo operation with one of the unique partition identifiers; and partitioning the given change event into the partition corresponding to the matching one of the unique partition identifiers.

7. The method of claim 1, wherein the distributed sink component includes a plurality of sink component instances, wherein each respective sink component instance maintains a local map indicating a subset of the partitions to which the respective sink component instance is mapped.

8. The method of claim 7, wherein each local map is a key-value pair data structure.

9. The method of claim 7, wherein the staging queue defines an even distribution of the plurality of partitions across the plurality of sink component instances such that a difference between each number of partitions mapped to each sink component instance is minimized.

10. The method of claim 7, further comprising:

determining that one of the sink component instances has become unavailable; and redistributing the partitions mapped to the unavailable sink component instance to the remaining sink component instances.

11. The method of claim 10, further comprising:

detecting that the unavailable sink component instance has resumed processing change events;

rebalancing the even distribution to account for the unavailable sink component instance resuming processing;

determining, for each respective one of the remaining sink component instances, a difference between the partitions mapped to the respective sink component instance before the partitions mapped to the unavailable sink component instance were redistributed and the partitions mapped to the respective sink component instance after the partitions mapped to the unavailable sink component instance were redistributed;

determining, based on the determined differences, change events duplicatively processed by each respective remaining sink component instance; and clearing, from a processing cache of each respective remaining sink component instance, the duplicatively processed change events.

12. The method of claim 1, further comprising:

determining, for each respective partition mapped to a given sink component instance, a most recently processed transaction for the respective partition.

13. The method of claim 12, wherein determining the most recently processed transaction for each respective partition includes:

determining, for each current change event being processed by the given sink component instance for the respective partition, whether the current change event is associated with a different transaction than a prior change event most recently processed by the given sink component instance for the respective partition; and upon determining that the transaction associated with the current change event is different than the transaction associated with the prior change event, determining that the transaction associated with the prior change event is the most recently processed transaction for the respective partition.

14. The method of claim 13, further comprising:

upon determining that the transaction associated with the current change event is different than the transaction associated with the prior change event, inserting, in a field associated with the respective partition in the bounded list, an end boundary for the transaction associated with the prior change event and a start boundary for the transaction associated with the current change event.

15. The method of claim 1, further comprising:

partitioning, using the distributed sink component, the bounded list into corresponding partitions of a target queue of the computing system.

16. The method of claim 15, further comprising:

storing the set of change events in a replay store communicably coupled to the staging queue.

17. The method of claim 16, further comprising:

detecting, in at least one partition of the target queue, one or more errors in the bounded list;

triggering a replay event for a timeframe relevant to the detected one or more errors;

retrieving, from the replay store, the change events corresponding to the at least one partition for the relevant timeframe based on the triggering;

partitioning the retrieved change events into corresponding partitions of the staging queue;

repairing, using the distributed sink component, one or more portions of the bounded list based on the retrieved change events; and partitioning the repaired bounded list into the corresponding partitions of the target queue.

18. The method of claim 15, further comprising:

providing, by the target queue, bounded transactions to a data repository based on the bounded list, wherein the data repository is a data warehouse including a data mart coupled to one or more reporting applications.

19. A system for bounding transactions, the system comprising:

one or more processors; and at least one memory coupled to the one or more processors and storing instructions that, when executed by the one or more processors, cause the system to perform operations including:

obtaining, at a source component, a set of change events, each change event associated with one of a plurality of unique identifiers and one of a plurality of transactions, wherein the obtaining includes extracting the set of change events from a source database, and wherein the source database is one of a plurality of source databases managed by a database management system (DBMS) serving a plurality of source applications;

partitioning, using the source component, the set of change events into a plurality of partitions of a staging queue based on the unique identifiers; and generating, using a distributed sink component that parallelly processes the set of change events from the staging queue, a bounded list indicating, for each respective transaction processed for each partition, a start boundary for the respective transaction, the change events associated with the respective transaction, and an end boundary for the respective transaction.

* * * * *